United States Patent
Boyce

(10) Patent No.: US 7,823,693 B2
(45) Date of Patent: Nov. 2, 2010

(54) VEHICLE INTERIOR PANEL ASSEMBLY

(75) Inventor: Dean Arden Boyce, Waterloo, IA (US)

(73) Assignee: Deere & Company, Moline, IL (US)

( * ) Notice: Subject to any disclaimer, the term of this patent is extended or adjusted under 35 U.S.C. 154(b) by 208 days.

(21) Appl. No.: 12/164,006

(22) Filed: Jun. 28, 2008

(65) Prior Publication Data

US 2009/0321182 A1 Dec. 31, 2009

(51) Int. Cl.
*E04B 1/82* (2006.01)
(52) U.S. Cl. .............. 181/284; 181/290; 181/286; 296/39.3; 296/211; 296/191
(58) Field of Classification Search ........... 181/284, 181/290, 286; 296/39.3, 211, 191
See application file for complete search history.

(56) References Cited

U.S. PATENT DOCUMENTS

| | | | | |
|---|---|---|---|---|
| 1,844,156 | A | * | 2/1932 | Groehn ................... 52/211 |
| 2,090,459 | A | * | 8/1937 | Paton .................... 296/191 |
| 3,990,604 | A | * | 11/1976 | Barnett et al. ............ 220/787 |
| 4,117,641 | A | * | 10/1978 | Wells ..................... 52/404.3 |
| 4,549,334 | A | * | 10/1985 | Miller ..................... 29/278 |
| 5,652,413 | A | * | 7/1997 | Mulera .................... 181/141 |
| 7,207,617 | B2 | * | 4/2007 | Pelini .................... 296/29 |
| 7,431,128 | B2 | * | 10/2008 | Choi ..................... 181/296 |
| 7,503,429 | B2 | * | 3/2009 | Boyce .................... 181/290 |
| 2007/0132278 | A1 | * | 6/2007 | Lester et al. .............. 296/191 |

OTHER PUBLICATIONS

Deere & Co., Exhibit 1, 6 pages, images of interior panels on prior art production John Deere tractors.
Deere & Co., Exhibit 2, 5 pages, images of details of interior panels on prior art production John Deere tractors.

* cited by examiner

*Primary Examiner*—Jeffrey Donels
*Assistant Examiner*—Forrest M Phillips

(57) ABSTRACT

The invention relates to an acoustic panel assembly. There is a need for a simple and inexpensive acoustic panel assembly. An acoustic panel assembly includes a rigid panel with an opening. The panel has an edge rib surrounding the opening, and a wall spaced apart from and surrounding the edge rib. The panel assembly also includes a frame member and a sound control sheet. The frame member has an outer border and a plurality of cross-pieces extending between different parts of the border. A compression rib projects forwardly from an inner edge of the border. The sound control sheet is mounted in and fills the opening. The sheet has an outer edge portion held between the rib of the rigid panel, the wall of the rigid panel, the border of the frame and the compression rib of the frame. The compression rib projects into a rear side of the sheet. The sheet forms a shoulder. The shoulder and the edge rib form a coach joint. The frame cross-pieces engaging a rear surface of the sheet. A plurality of retention points project from a rear surface of the edge rib. Each retention point projects into a fabric covered front surface of the sheet.

7 Claims, 6 Drawing Sheets

VEHICLE INTERIOR PANEL ASSEMBLY

FIELD OF THE INVENTION

The present invention relates to an interior panel assembly for a vehicle.

BACKGROUND OF THE INVENTION

Agricultural tractor cabs have interior fender covers which cover portions of the tractor fenders and which reduce noise in the cab. Such fender covers have a perforated surface and a perforated substrate, so that sound can pass through the perforations and be absorbed by sound absorbing material below the substrate. Such covers are expensive and do not adequately reduce noise, because not all the noise will pass through the perforations and be absorbed by the sound absorbing material. In such covers, the sound absorbing material is not directly exposed to the interior of the cab.

A simpler, lower cost and better sound absorbing panel assembly is desired.

SUMMARY OF THE INVENTION

Accordingly, an object of this invention is to provide a simple low cost acoustical panel assembly.

This and other objects are achieved by the present invention, wherein an acoustic panel assembly includes a rigid panel with an opening therein. The panel has a rib surrounding the opening, and a wall spaced apart from the surrounding the rib. The panel assembly also includes a frame member and a sound control sheet. The frame member has an outer border and a plurality of cross-pieces extending between different parts of the border. A compression rib projects forwardly from an inner edge of the border. The sound control sheet is mounted in and fills the opening. The sheet has an outer edge portion held between the rib of the rigid panel, the wall of the rigid panel, the border of the frame and the compression rib of the frame. The compression rib projects into a rear side of the sheet. The sheet forms a shoulder. The shoulder and the rib of the rigid panel form a coach joint. The frame cross-pieces engaging a rear surface of the sheet. A plurality of retention points project from a rear surface of the rib of the panel. Each retention point projects into a front surface of the sheet.

DESCRIPTION OF THE PREFERRED EMBODIMENT

Figure 1:
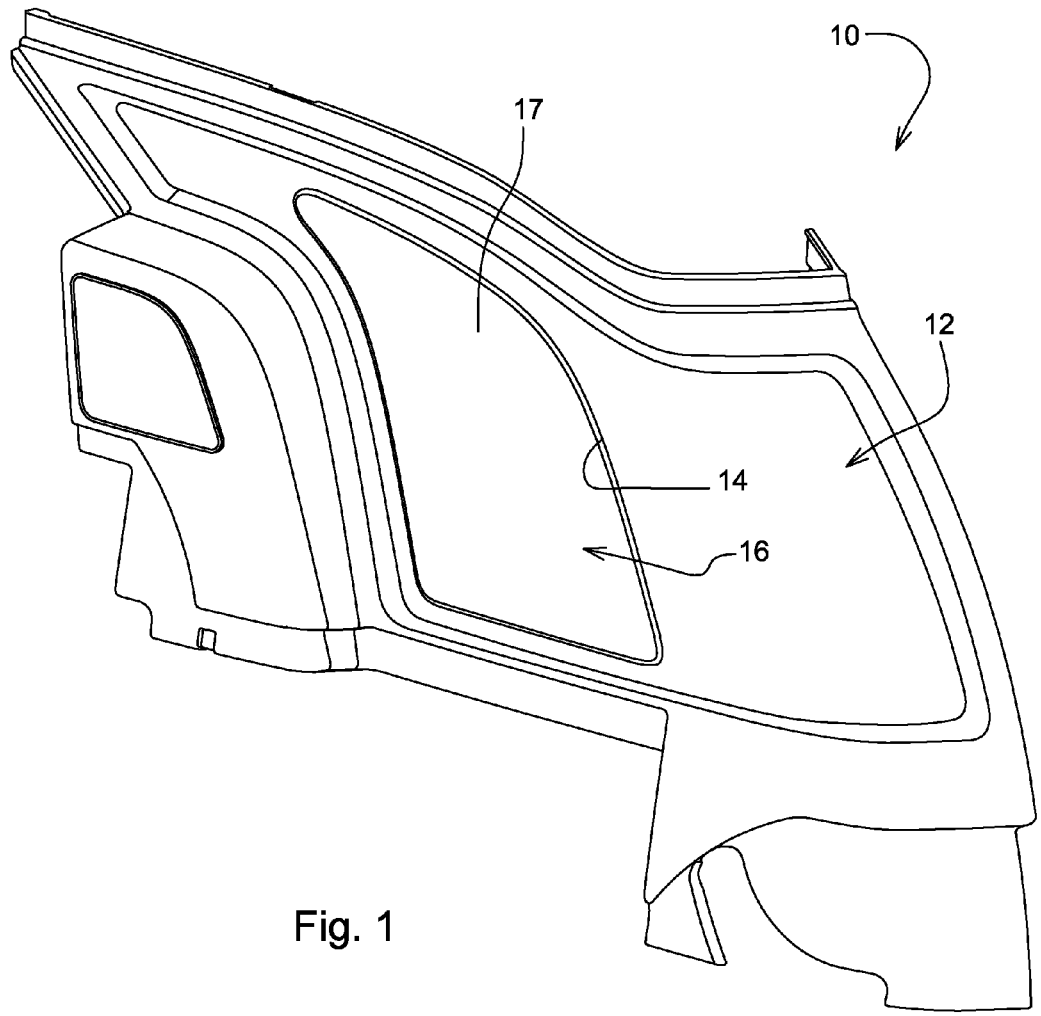
FIG. 1 is a front side perspective view of a panel assembly according to the present invention.
Figure 2:
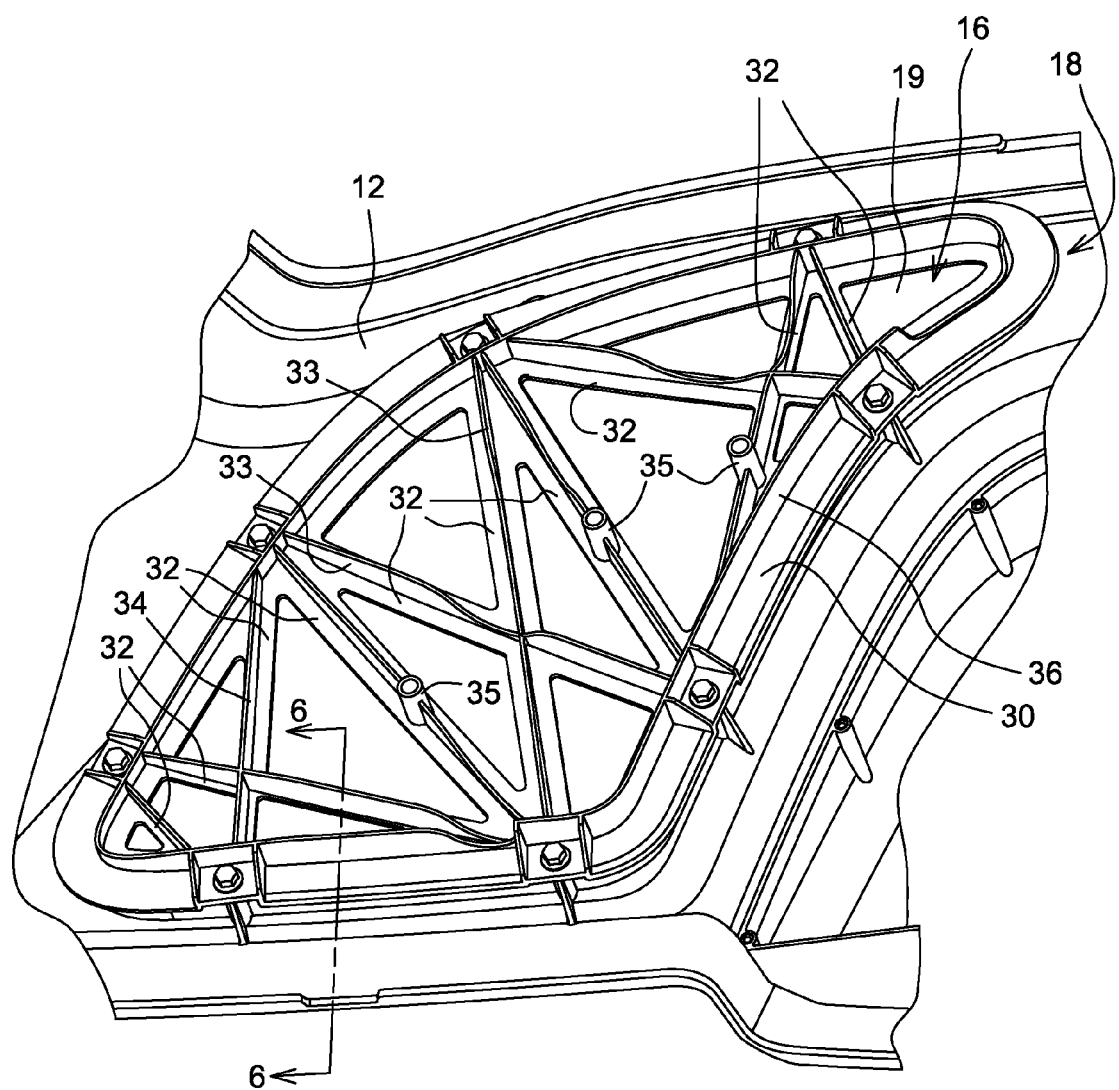
FIG. 2 is a rear side perspective view of the panel assembly of FIG. 1.

Referring to FIGS. 1 and 2, the panel assembly 10 includes a rigid panel 12 which surrounds an opening 14, a sound control sheet 16 mounted in the opening 14, and a frame 18 which is mounted to the panel 12 behind the sheet 16. Sheet 16 preferably has a woven fabric outer face 17 on a layer of acoustical foam 19. The sound control sheet 16 is held between frame 18 and the rigid panel 12.

Figure 3:
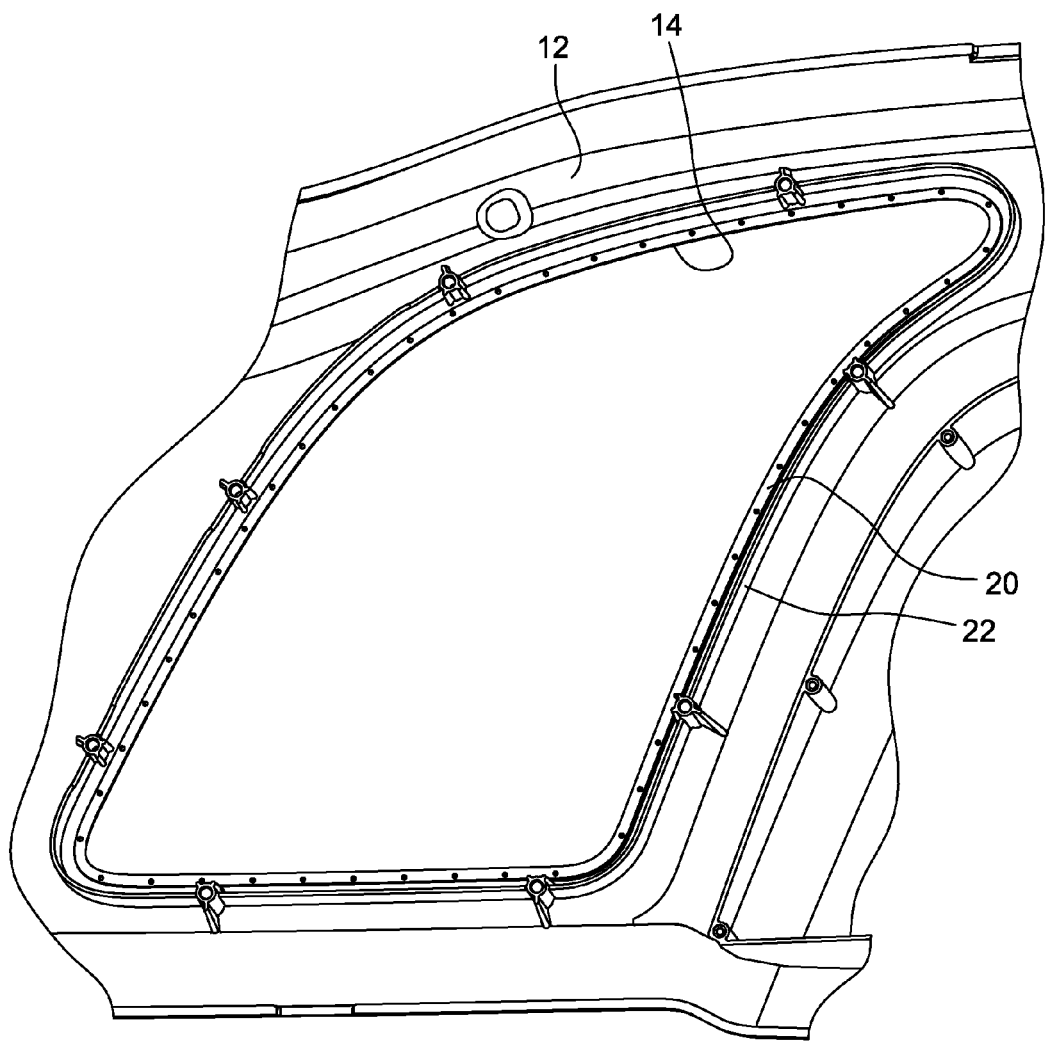
FIG. 3 is a rear side perspective view of the rigid panel of FIG. 1 with the frame and sound control sheet removed.
Figure 4:
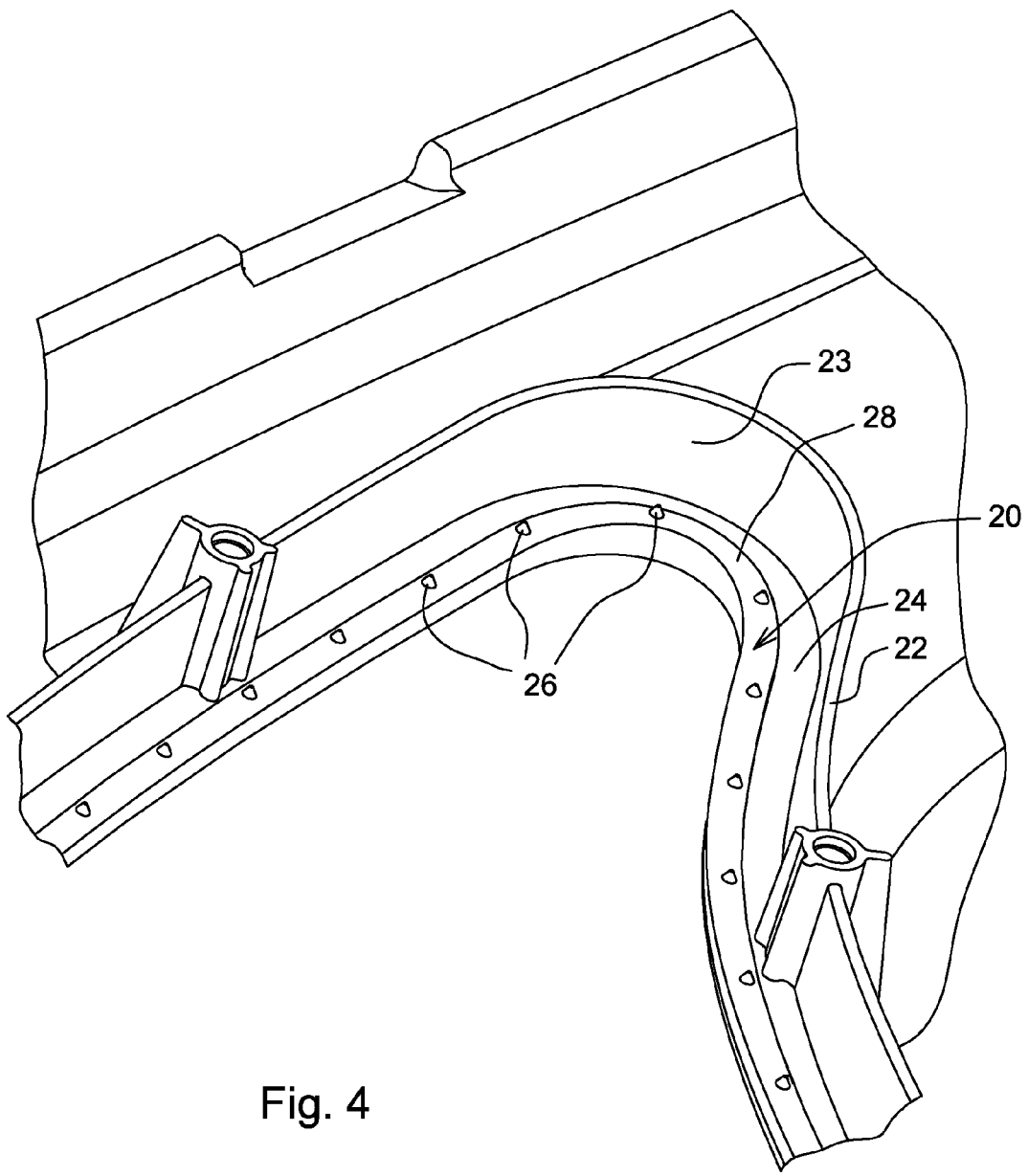
FIG. 4 is an enlarged rear perspective view of a portion of the rigid panel of FIG. 3.

As best seen in FIGS. 3 and 4, the panel 12 includes an inner rib 20 which surrounds and is adjacent to the opening 14, and a wall 22 which is spaced outwardly apart from the rib 20 and which projects away from the body of the panel 12. The rib 20 and the wall 22 project rearwardly and are separated by a groove or channel 24. A plurality of spaced apart retention points 26 are formed on the rear surface 28 of the rib 20. The wall 22 has an inner surface 23.

Figure 5:
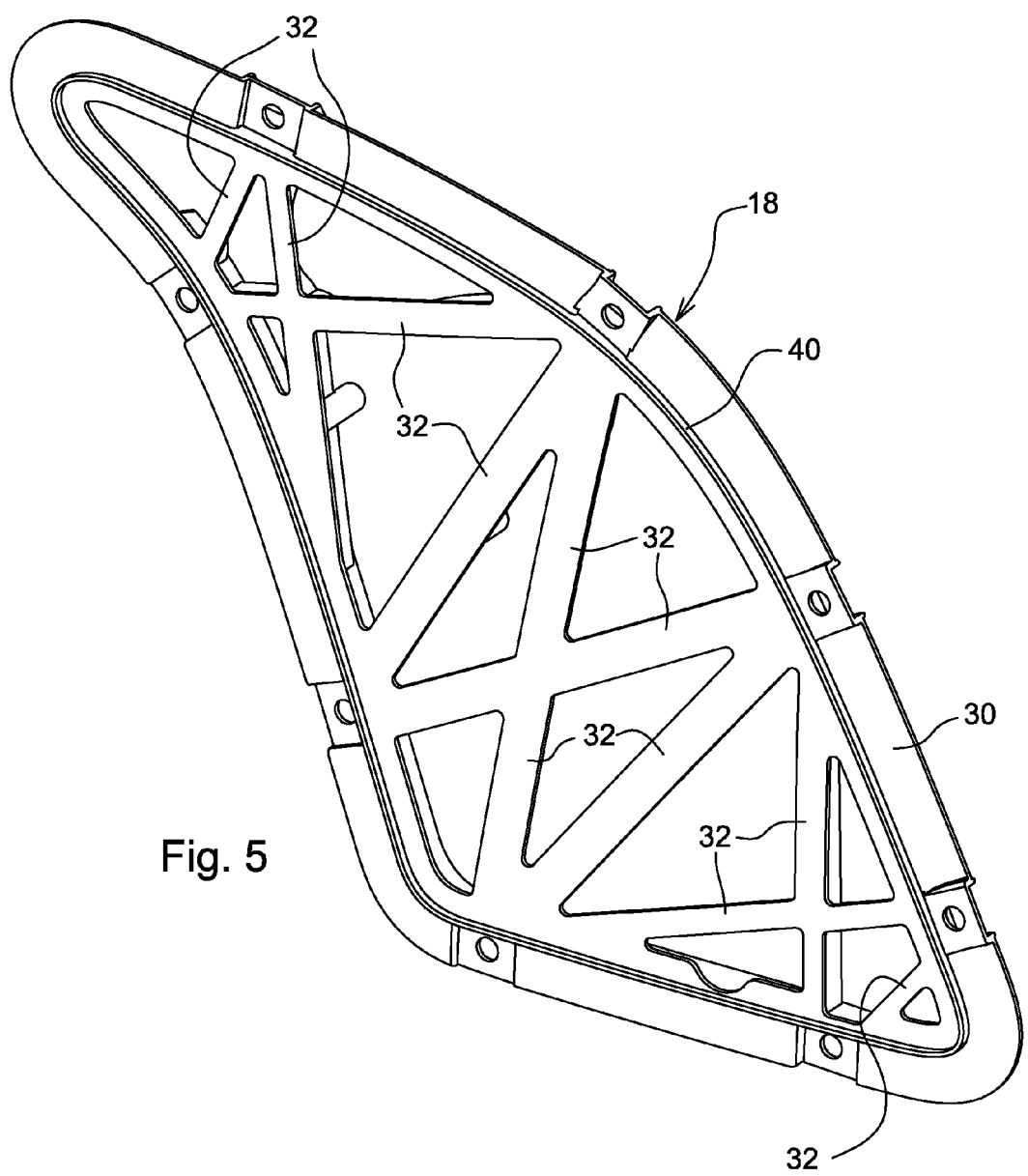
FIG. 5 is a front perspective view of the frame of FIG. 1.
Figure 6:
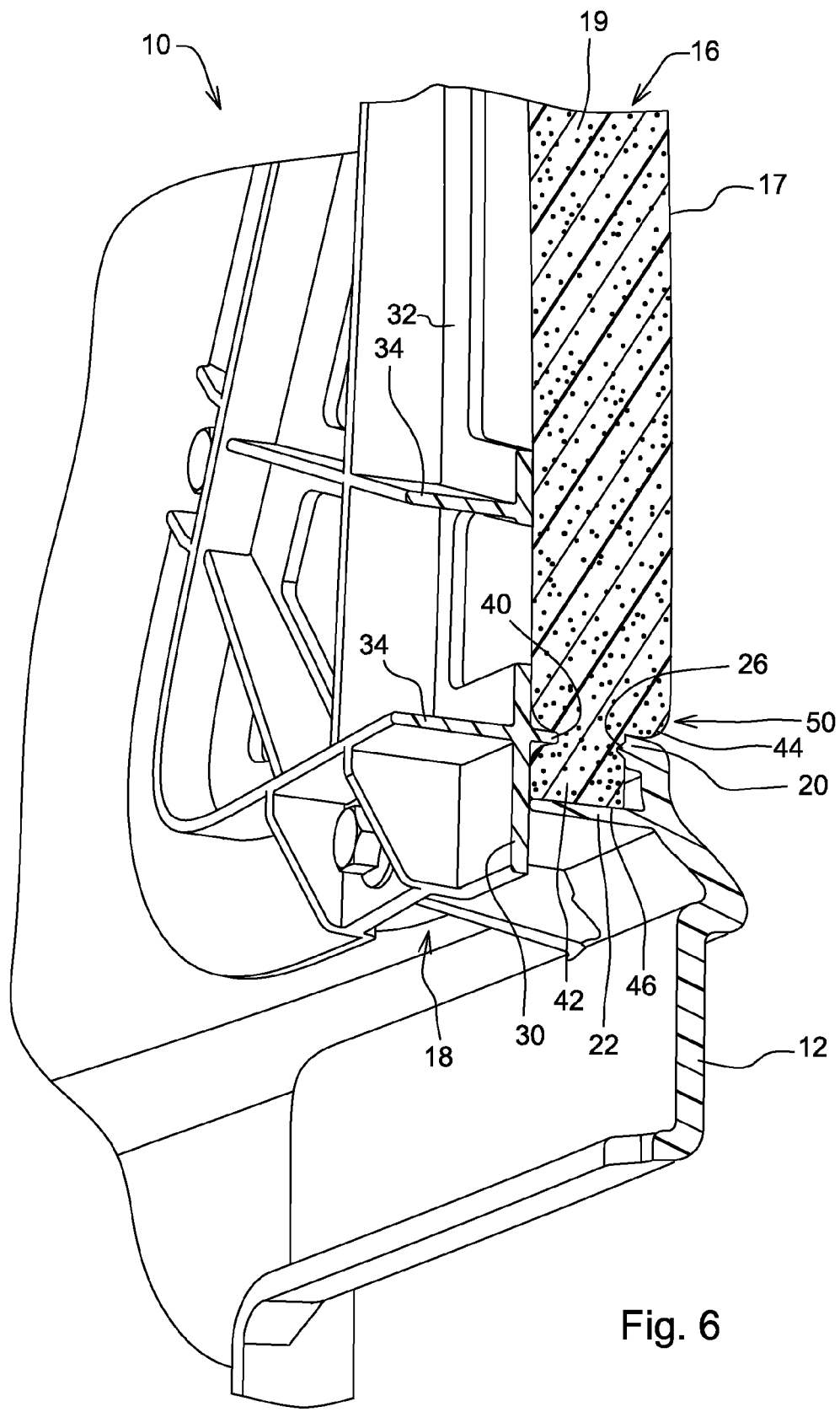
FIG. 6 is an enlarged sectional perspective view along lines 6-6 of FIG. 2.

As best seen in FIGS. 2 and 5, the frame 18 includes an outer border part 30 and a number of cross-pieces 32 which extend across between different parts of the border part 30. Each cross-piece has a T-shaped sectional shape and includes a stiffening ridge 34. A stiffening wall 36 projects rearwardly from an inner edge of the border part 30. As best seen in FIGS. 5 and 6, a small compression rib 40 projects forwardly from an inner edge of the border part 30. The cross-pieces 32 form a web which supports the back of the sound control sheet 16. The flat surface of the cross-pieces 32 engage against the back of the foam 19.

The T-shaped cross-pieces 32 prevent deflection of the frame 18 when pressure is applied to it through the sound control sheet 16. Parts of the ridges 34 are locally reduced in height to provide clearance for harness and cable routings (not shown) after the assembly 10 is mounted to the frame of a cab (not shown). Bosses 35 engage the cab's steel frame surface (not shown) behind the assembly 10 and provide for a positive lateral position of the assembly.

Referring now to FIG. 6, an outer edge portion 42 of the sound control sheet 16 is held between the rib 20 of rigid panel 12 and the border part 30 of frame 18. The outer edge portion 42 has an outer peripheral surface 46. Compression rib 40 projects into edge portion 42 from the rear and retention points 26 projects into a front surface of the edge portion 42 of the sheet 16. The cross-pieces 32 engage and hold in place the rear surface of the sound control sheet 16. The sound control sheet 16 forms a curved shoulder 44 which engages an inner surface of the rib 20. The inner edge of rib 20 and shoulder 44 form an esthetically pleasing "coach" joint. The outer peripheral surface 46 of the edge portion 42 engages the inner surface 23 of the wall 22. The curved shoulder 44 is spaced inwardly with respect to the outer peripheral surface 46.

The sheet 16 may have woven or non-woven cloth 17 bonded to the acoustical foam 19 with a PSA adhesive web. This material stack is then die cut to shape and size to produce the sound control sheet 16. Using cloth, woven or non-woven, provides an asthetically pleasing surface which is porous and allows sound waves to pass through to the sound absorbing layer of foam 19. No secondary perforating process is needed to allow the sound wave to pass through this surface.

The panel 12 and the frame 18 are preferably injection molded parts which provide the structure for the assembly, mounting points to the cab frame (not shown) and console (not shown), and a finished appearance surface. The sound control sheet 16 is assembled to the panel 12 by inserting it inside the locating rib 20 which runs around the panel opening 14. This exposes the cloth surface 17 of the sheet 16 to the operator side of the assembly and directly to the sound waves that need to be absorbed. The rear frame 18 may be attached to the panel 12 with screws. Alternatively, the frame 18 could be attached to the panel with molded-in snaps (not shown) or clips (not shown) instead of screws.

The dimensions of the rib 20 are designed so that part of the sound control sheet 16 is formed into a "coach joint" 50 in the final assembly. The retention points 26 engage the woven cloth 17 of the sheet 16 as the sheet 16 is placed inside the locating wall 22 and hold the cloth 17 in place relative to the opening 14 in the panel 12. As the rear frame 18 is assembled to the panel 12, the points 26 push into the cloth and keep the rough die cut edge 46 from being exposed on the finished side of the assembly 10.

The rear frame 18, after installation, forms and holds the sheet 16 to the same shape and level as the surface of the panel 12. This provides a very pleasing aesthetic look to the panel assembly. The compression rib 40 of the frame 18 is positioned substantially opposite to the rib 20 of the panel 12. The length of wall 22 and the distance between the ends of the rib 40 and the rib 20 controls how much the perimeter of sheet 16 is crushed or compressed.

The result is a panel assembly wherein the sound control sheet 16 is directly exposed to sound and noise in the interior of the tractor cab (not shown), which maximizes the noise reducing effectiveness of the sheet 16. The design uses economical and quality processes to produce the unit parts. This assembly uses the economy of two injection molded plastic parts and a die cut sound control sheet to reduce cost. By using cloth 17 that is porous to sound, no secondary operations are required to the surface to allow passage of sound wave energy to the sound absorbing layer 19. The assembly 10 provides improved sound control while it is also structurally sound and aesthetically pleasing at a lower cost than current designs.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An acoustic panel assembly comprising:
   a rigid panel having a front side, a rear side and an opening therein, the panel having an edge rib projecting rearwardly and surrounding the opening, and the panel having a wall spaced apart from and surrounding the edge rib;
   a frame having an outer border and a plurality of cross-pieces extending between different parts of the border, the frame having a compression rib projecting in a front direction and towards the panel from an inner portion of the border; and
   a sound control sheet mounted in the opening and having a surface exposed directly to sound, the sheet having an outer edge portion held between the edge rib, the wall, the border part of the frame and the compression rib of the frame, the compression rib projecting into a rear side of the sheet, the edge rib projecting into a front side of the sheet, the sheet forming a shoulder, and the shoulder and the edge rib forming a coach joint.
2. The panel assembly of claim 1, wherein:
   each cross-piece engages a rear surface of the sheet.
3. The panel assembly of claim 2, wherein:
   each cross-piece has a stiffening ridge and a T-shaped cross-sectional shape.
4. The panel assembly of claim 1, wherein:
   a plurality of retention points project from a rear surface of the edge rib, each retention point projecting into a front surface of the sheet.
5. The panel assembly of claim 1, wherein:
   the sound control sheet comprises acoustical foam with a side covered by a fabric.
6. The panel assembly of claim 1, wherein:
   the sound control sheet comprises acoustical foam with a side covered by a fabric; and
   a plurality of retention points project from a rear surface of the edge rib, each retention point projecting into the fabric of the sheet.
7. An acoustic panel assembly comprising:
   a rigid panel having a front side, a rear side and a panel aperture therein, the panel having a continuous edge rib completely surrounding the panel aperture, and the panel having a wall spaced apart from and surrounding the edge rib;
   a frame having an outer border and a plurality of cross-pieces extending in different directions between different parts of the border and forming a plurality of frame apertures therebetween, the frame having a continuous compression rib projecting towards the panel from an inner portion of the border an completely surrounding a portion of the border; and
   a sound control sheet mounted in the opening and having a surface exposed directly to sound, the sheet having an outer edge portion held between the edge rib, the wall, the border part of the frame and the compression rib of the frame, the compression rib projecting into a rear side of the sheet, the sheet forming a shoulder, and the shoulder and the edge rib forming a coach joint.

\* \* \* \* \*